(12) United States Patent
Bara et al.

(10) Patent No.: US 11,685,796 B2
(45) Date of Patent: Jun. 27, 2023

(54) METHODS FOR CONVERTING PVC TO ELASTOMERS

(71) Applicant: The Board of Trustees of the University of Alabama, Tuscaloosa, AL (US)

(72) Inventors: Jason Edward Bara, Tuscaloosa, AL (US); Paul A. Rupar, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 0 days.

(21) Appl. No.: 17/391,691

(22) Filed: Aug. 2, 2021

(65) Prior Publication Data

US 2022/0033541 A1    Feb. 3, 2022

Related U.S. Application Data

(60) Provisional application No. 63/060,090, filed on Aug. 2, 2020.

(51) Int. Cl.
| | |
|---|---|
| *C08F 8/26* | (2006.01) |
| *C08F 14/06* | (2006.01) |
| *B01J 23/44* | (2006.01) |
| *B01J 21/18* | (2006.01) |
| *C08F 8/04* | (2006.01) |

(52) U.S. Cl.
CPC .............. *C08F 8/26* (2013.01); *B01J 21/18* (2013.01); *B01J 23/44* (2013.01); *C08F 8/04* (2013.01); *C08F 14/06* (2013.01)

(58) Field of Classification Search
CPC .......... C08F 2810/10; C08F 8/50; C08F 8/34; C08F 8/36; C08F 14/06; C08F 114/06; C08F 214/06; C08F 8/04
See application file for complete search history.

(56) References Cited

U.S. PATENT DOCUMENTS

| | | | | |
|---|---|---|---|---|
| 3,053,821 A | * | 9/1962 | Rees | .................. C08F 8/04 525/338 |
| 3,896,091 A | * | 7/1975 | Fabris | .................. C08F 8/46 525/292 |
| 2007/0083068 A1 | | 4/2007 | Ramesh et al. | |

FOREIGN PATENT DOCUMENTS

| | | | |
|---|---|---|---|
| CN | 101948595 | | 1/2011 |
| JP | 2002-128953 | * | 5/2002 |

OTHER PUBLICATIONS

Kise, Journal of Polymer Science: Polymer Chemistry Edition, vo. 20, 3189-3197 (1982) (Year: 1982).*
Translation of JP 2002-128953 (Year: 2002).*
Yu, J.; et al. Thermal degradation of PVC: A review. Waste Manage. (Oxford, U.K.) 2016, 48, 300-314.
Suresh, Sunil S., Smita Mohanty, and Sanjay K. Nayak. "Synthesis and application of functionalised acrylonitrile-butadiene rubber for enhancing recyclability of poly (vinylchloride)(PVC) and poly (methylmethacrylate)(PMMA) in recycled blends." Clean Technologies and Environmental Policy 20.5 (2018): 969-979.
Oh, Sea Cheon, Woo-Teck Kwon, and Soo-Ryong Kim. "Dehydrochlorination characteristics of waste PVC wires by thermal decomposition." Journal of Industrial and Engineering Chemistry 15.3 (2009): 438-441.
Braun, Dietrich. "Recycling of PVC." Progress in polymer science 27.10 (2002): 2171-2195.
Lu, L.; Kumagai, S.; Kameda, T.; Luo, L.; Yoshioka, T. Degradation of PVC waste into a flexible polymer by chemical modification using DINP moieties. RSC Advances 2019, 9, 28870-28875.
Hoydonckx, H.E., Van Rhijn, W.M., Van Rhijn, W., De Vos, D.E. and Jacobs, P.A. (2007). Furfural and Derivatives. In Ullmann's Encyclopedia of Industrial Chemistry, (Ed.). doi:10.1002/14356007. a12_119.pub2.
Lin, K.-F.; Lin, J.-S.; Cheng, C.-H. High temperature resins based on allylamine/bismaleimides. Polymer 1996, 37, 4729-4737.

* cited by examiner

*Primary Examiner* — Robert C Boyle
(74) *Attorney, Agent, or Firm* — Meunier Carlin & Curfman LLC

(57) ABSTRACT

Disclosed are methods for upcycling polyvinyl chloride (PVC) that involve the dissolving of PVC in an organic solvent; and contacting the PVC with a base, thereby providing a partially dehydrochlorinated PVC. Polymers made by the disclosed, and articles therefore, are also disclosed.

21 Claims, 1 Drawing Sheet

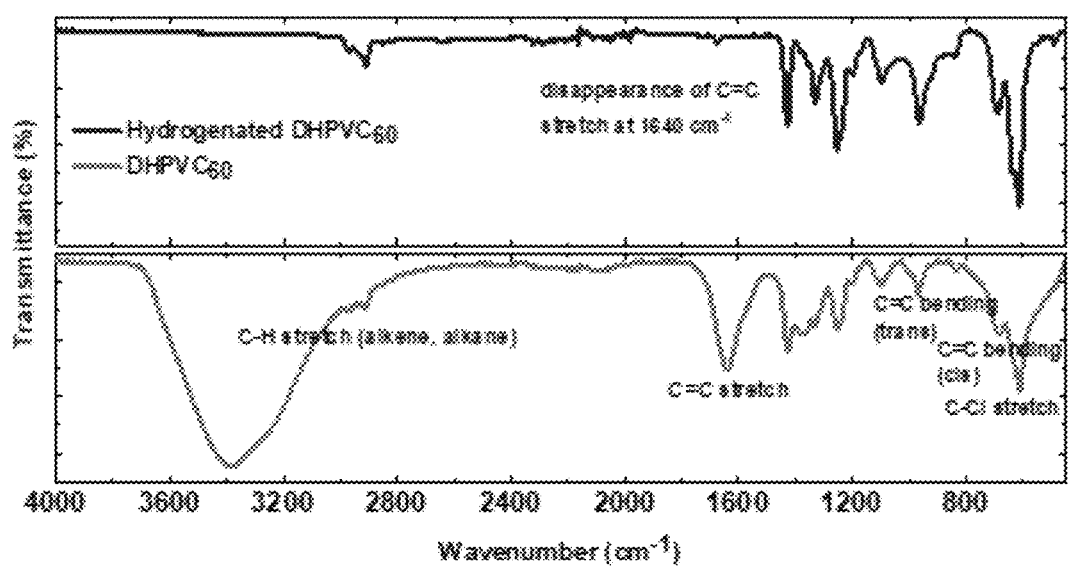

METHODS FOR CONVERTING PVC TO ELASTOMERS

CROSS REFERENCE TO RELATED APPLICATIONS

This application claims the benefit of priority to U.S. Provisional Application No. 63/060,090, filed Aug. 2, 2020, which is incorporated by reference herein in its entirety.

BACKGROUND

PVC is the $3^{rd}$-most widely produced synthetic polymer worldwide, following only polyethylene (PE) and polypropylene (PP). PVC is used in a wide variety of disposable products such as food packaging, beverage bottles, and textiles as well as in long-life products such as pipes, window frames, cable insulation, and roofing materials. This means that the amount of PVC waste will increase over time as the long-life products are eventually disposed. Landfilling or incineration of PVC is generally unfavorable due to the formation and release of chlorine-containing compounds (e.g., HCl and organics). Mechanical recycling of PVC (and thermoplastics in general) typically results in "downcycling" as the process is sensitive to impurities, truncates polymer MW, and yields a product with inferior properties compared to the virgin material.

PVC waste is highly desirable for upcycling applications as its propensity to undergo reactions that makes it undesirable for landfilling are actually advantageous when performed in a controlled manner. Under appropriate conditions, PVC can be upcycled into diverse useful and valuable polymer materials through controlled partial dehydrochlorination followed by subsequent functionalization and/or crosslinking. Here, the targeted products are a useful elastomers (rubber) that are chemically akin to poly(chloroprene) (trade name: Neoprene), a well-known thermally and electrically insulating waterproof rubber barrier. The similarities between the structures of PVC, poly(chloroprene), and PVC which has been partially dehydrochlorinated (DHPVC) are as follows (where n and m are integers defining the number of repeating units, which depending on the molecular weight of the polymer can vary from 2 to 100,000 Da or more).

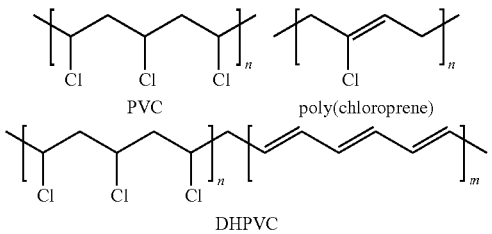

PVC  poly(chloroprene)

DHPVC where n and m are integers from 1 to $1 \times 10^6$.

Unlike PE and PP, PVC is "activated" and is more readily susceptible to reaction, especially in the presence of acid or base. The chlorine atoms on the PVC backbone are labile, leaving PVC prone to dehydrochlorination, an elimination reaction that forms $-(HC=CH)_n-$ "polyene" segments. Partial dehydrochlorination of PVC can be used as a means of altering PVC properties, but if performed under uncontrolled conditions, spontaneous crosslinking and/or complete degradation can occur. The typical degradation products include aromatic compounds (formed from cyclization of the polyene segments) and HCl (Yu, J.; et al. Thermal degradation of PVC: A review. *Waste Manage.* (Oxford, U. K.) 2016, 48, 300-314), although these products are of low value and can be obtained more readily by other means. However, the activated nature of PVC can be advantageous if used in a controlled manner as it yields unique opportunities to create value-added products from an end-of-life-product that would otherwise be disposed of.

What are needed are new ways to upcycle PVC, converting it into useful polymers and oligomers. New products from these upcycling methods are also desirable. The methods and compositions disclosed herein address these and other needs.

SUMMARY

In accordance with the purposes of the disclosed materials, compounds, compositions, articles, devices, and methods, as embodied and broadly described herein, the disclosed subject matter relates to compositions and methods of making and using the compositions. In other aspects, the disclosed subject matter relates to methods for upcycling polyvinyl chloride (PVC). In specific aspects, disclosed are methods of partially dehydrochlorinating PVC that comprise dissolving the PVC in an organic solvent; and contacting the PVC with a base, thereby providing a partially dehydrochlorinated PVC. Further, disclosed are methods whereby the partially dehydrochlorinated PVC are partially hydrogenated by contacting the partially dehydrochlorinated PVC with hydrogen in the presence of a hydrogenation catalyst, thereby providing a partially hydrogenated, dehydrochlorinated PVC. In yet further aspects, the partially hydrogenated, dehydrochlorinated PVC can again be dehydrochlorinated by dissolving the partially hydrogenated, dehydrochlorinated PVC in a second organic solvent and adding a second base. Still, in further aspects, disclosed are methods whereby the partially hydrogenated, dehydrochlorinated PVC are contacted with a nucleophile substituted diene in the presence of a mild base, to provide a diene substituted partially hydrogenated dehydrochlorinated PVC; and contacting the diene substituted partially hydrogenated dehydrochlorinated PVC with a bis-dienophile. In still further aspects, disclosed are methods whereby partially dehydrochlorinated PVC and partially hydrogenated, dehydrochlorinated PVC are contacted with sulfur or other crosslinking agents. Polymers made by the disclosed methods, and articles of the disclosed polymers are also disclosed.

Additional advantages of the disclosed subject matter will be set forth in part in the description that follows and the Figures, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

FIG. 1 is a comparison of FT-IR spectra for $DHPVC_{60}$ (top) and $H_2$-$DHPVC_{60}$ illustrating hydrogenation of alkene segments. The large peak at 3300 cm$^{-1}$ in DHPVC$_{60}$ is due to residual water in the sample post-precipitation.

DETAILED DESCRIPTION

The materials, compounds, compositions, articles, and methods described herein may be understood more readily by reference to the following detailed description of specific aspects of the disclosed subject matter and the Examples and Figures included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Chemical Definitions

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halides, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkoxy" as used herein is an alkyl group bound through a single, terminal ether linkage; that is, an "alkoxy" group can be defined as —$OZ^1$ where $Z^1$ is alkyl as defined above.

The term "alkenyl" as used herein is a hydrocarbon group of from 2 to 24 carbon atoms with a structural formula containing at least one carbon-carbon double bond. Asymmetric structures such as $(Z^1Z^2)C=C(Z^3Z^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is included in the term "aryl," defines a group that contains an aromatic group that does not contain a heteroatom. The aryl or heteroaryl group can be substituted or unsubstituted. The aryl or heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like.

The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" or "CO" is a short hand notation for C=O, which is also referred to herein as a "carbonyl."

The terms "amine" or "amino" as used herein are represented by the formula $NZ^1Z^2$, where $Z^1$ and $Z^2$ can each be substitution group as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above. "Amido" is —C(O)$NZ^1Z^2$.

The term "carboxylic acid" as used herein is represented by the formula —C(O)OH. A "carboxylate" or "carboxyl" group as used herein is represented by the formula —C(O)O$^-$.

The term "ester" as used herein is represented by the formula —OC(O)$Z^1$ or —C(O)O$Z^1$, where $Z^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $Z^1OZ^2$, where $Z^1$ and $Z^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $Z^1C(O)Z^2$, where $Z^1$ and $Z^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" or "halogen" as used herein refers to the fluorine, chlorine, bromine, and iodine.

The term "hydroxyl" as used herein is represented by the formula —OH.

The term "nitro" as used herein is represented by the formula —NO$_2$.

The term "silyl" as used herein is represented by the formula —SiZ$^1$Z$^2$Z$^3$, where Z$^1$, Z$^2$, and Z$^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfonyl" is used herein to refer to the sulfo-oxo group represented by the formula —S(O)$_2$Z$^1$, where Z$^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula —S(O)$_2$NH—.

The term "thiol" as used herein is represented by the formula —SH.

The term "thio" as used herein is represented by the formula —S—.

Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture.

Reference will now be made in detail to specific aspects of the disclosed materials, compounds, compositions, articles, and methods, examples of which are illustrated in the accompanying Examples and Figures.

Methods for Partial Dehydrochlorination of PVC

It is demonstrated herein that controlled partial dehydrochlorination of PVC in THF using a base such as NaOH exclusively promotes elimination of HCl from the PVC backbone, resulting in dehydrochlorinated PVC (DHPVC). A strong red-orange color is observed, indicative of conjugated polyene segments such as those contained in (3-carotene and similar natural products. The degree of dehydrochlorination can been monitored by ATR/FT-IR. Substitution reactions (i.e., replacing —Cl with —OH) are not observed under these conditions, likely given the limited solubility of NaOH in THF. DHPVC remains soluble and stable in THF up to at least about 95% dehydrochlorination (forming "DHPVC$_{95}$"), and the DHPVC products are is easily recovered in high yield via precipitation in water.

The disclosed process can start from commercial PVC (e.g., "rigid" PVC pipe, cladding, siding) of the form that could be obtained from a concentrated waste management program focused on construction sites. It can also start from consumer PVC (e.g., packaging, containers, tubing). Still further, by "PVC" is also meant related chlorinated plastics such as CPVC, CPE, and PVDC. CPVC is produced by reaction of PVC with Cl$_2$ gas in the presence of free radicals, with additional Cl atoms replacing a portion of the H atoms on the PVC backbone. Whereas PVC can be about 57% Cl by mass, the composition of CPVC is typically about 63-69% Cl by mass, corresponding to ~2 Cl atoms for every 3 C atoms in the polymer backbone. CPVC is used primarily for both cold and hot water piping as it can operate up to 93° C. (200° F.), whereas PVC is limited to 60° C. (140° F.). CPVC can also undergo dehydrochlorination reactions and because of the additional Cl atoms, will present some alkyne functionalities in the backbone which can enable the formation of different value-added small molecule products/product distributions. CPE is derived from PE in a process similar to that by which CPVC is produced from PVC. The mass of Cl in CPE is typically in the range of 34-44%, meaning there is about 1 Cl atom per 4 C atoms in the CPE backbone, although the distribution/spacing of Cl atoms is random. CPE is often blended with PVC as a softener to improve impact resistance. Thus, CPE may also be present within waste PVC that does not come from pipes and CPE can be depolymerized along with PVC.

PVDC is perhaps best known as the original formulation of Saran Wrap® (aka "cling wrap") a widely-used household food storage product with remarkable barrier properties against water, oxygen, and aromas. PVDC decomposes above 125° C., releasing HCl and forming polyene segments that serve as activated sites for depolymerization of the polymer backbone via ethenolysis or oxidative cleavage.

In the disclosed methods, the PVC can be cut into smaller pieces, e.g., using a saw or shredder, and these fragments can be stirred in warm THF or other organic solvent. Upon dissolution of the PVC and any organic additives, the inorganic additives (primarily CaCO$_3$) remain insoluble and can be readily removed by filtration. This CaCO$_3$ is generally a harmless product that could be safely disposed or perhaps reused/resold for other applications. Rigid PVC (used for drinking water) is generally free of phthalate plasticizers although it can contain organotin compounds (e.g. dibutyltin dilauarate), which function as stabilizers. These organotin compounds can be hydrolyzed by NaOH and then precipitated from the reaction mixture and can be separated by filtration. This requires a slight excess base (e.g., NaOH) in order to achieve the desired degree of dehydrochlorination, however, the reaction then proceeds in the same manner as for the virgin PVC samples.

Thus, in specific examples disclosed are methods for partially dehydrochlorinating PVC that comprise dissolving the PVC in an organic solvent; and contacting the PVC with a base, thereby providing a partially dehydrochlorinated PVC. Prior to or after contacting the dissolved PVC with base, insoluble inorganic materials can be removed, e.g., by filtration or precipitation.

The disclosed method for partially dehydrochlorination of PVC can be carried out at temperatures from about room temperature to about below 350° C. For example, the reaction can be carried out at temperatures from room temperature to about the boiling point of the solvent used at the pressure used. In some aspects, the reaction temperature can be from about 20° C. to 250° C., about 20° C. to 200° C., about 20° C. to 150° C., about 20° C. to 100° C., about 20° C. to about 60° C., from about 60° to about 100° C., or from about 100° C. to about 250° C.

The partially dehydrochlorinated PVC prepared by the disclosed methods can be from about 40% to about 95% dehydrochlorinated PVC, e.g., from about 60% to about 95%, from about 70% to about 95%, from about 80 to about 95%, or from about 90 to about 95% dehydrochlorinated PVC. These products can be denoted as DHPVC$_a$, where "a" is the degree of dehydrochlorination. As an example, DHPVC$_{60}$ is about 60% dehydrochlorinated (about 60% of the repeating units are —CH=CH— and about 40% of the repeating units are —CHCl—CH$_2$—. Thus, the disclosed methods can be used to prepare DHPVC$_{50}$, DHPVC$_{55}$, DHPVC$_{60}$, DHPVC$_{65}$, DHPVC$_{70}$, DHPVC$_{75}$, DHPVC$_{80}$, DHPVC$_{85}$, DHPVC$_{90}$, and DHPVC$_{95}$, and any rages of these compounds.

In specific examples, partially dehydrochlorinated PVC prepared by the disclosed methods can have the structure

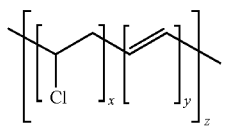

wherein x is from 1 to 1,000,000 (e.g., from 10 to 1,000,000, from 100 to 1,000,000, from 1000 to 1,000,000, from 10,000 to 1,000,000, from 100,000 to 1,000,000), y is from 1 to 1,000,000 (e.g., from 10 to 1,000,000, from 100 to 1,000,000, from 1000 to 1,000,000, from 10,000 to 1,000,000, from 100,000 to 1,000,000), and z is from 2 to 1,000,000 (e.g., from 10 to 1,000,000, from 100 to 1,000,000, from 1000 to 1,000,000, from 10,000 to 1,000,000, from 100,000 to 1,000,000).

The molecular weight of the DHPVC polymers prepared by the disclosed methods can be from about 2,000 daltons to about 10,000,000 daltons, and sometimes from about 5,000 daltons to about 500,000 daltons, and sometimes from about 15,000 daltons to about 200,000 daltons.

Organic Solvent

The limited solubility of PVC in most solvents and the properties of THF make it a suitable solvent for converting PVC to DHPVC. It is also contemplated herein that other organic solvents besides THF can be used, including mixtures of solvents. The organic solvent should be able to dissolve PVC and generally include polar organic solvents and solvent mixtures thereof. Exemplary organic solvents that can be used include, but are not limited to, tetrahydrofuran (THF), dichloromethane (DCM), chloroform ($CHCl_3$), acetonitrile, dimethyl sulfoxide (DMSO), pyridine, N-methylpyrrolidine (NMP), dimethylformamide (DMF), dimethylacetamide (DMA), dioxane, glycol solvents, methanol, ethanol, propanol, butanol, ethyl acetate (EtOAc), methyl ethyl ketone, acetone, and the like, including mixtures thereof. Selecting the appropriate organic solvent or solvent mixture can be done based on the molecular weight of the PVC, the size of the PVC particles or pieces, temperature, the presence or absence of inorganic or organic additives and plasticizers, and the like. In specific examples, the solvent can be THF or DMF. The organic solvent can also be heated to facilitate the dissolution of the PVC. In other examples the solvent can be hexane or methanol, which can be used for heterogenous reactions.

The amount of organic solvent that can be used can vary. Generally, amounts of organic solvent that permit dissolution of the quantity of PVC being treated should be used. Other preferences of the practitioner, e.g., easy of handling, availability, cost, etc., can be a factor in selecting the appropriate amount and type of organic solvent.

Base

The base that can be used in the disclosed methods is generally a strong base. Exemplary bases include, but are not limited to, hydroxides, alkoxides and fluorides of the alkali metals and alkaline earth metals, carbonates, hydrogen-carbonates, phosphates, amides, silazides of the alkali metals, and combinations thereof. Particularly suitable bases include potassium hydroxide, sodium hydroxide, sodium carbonate, potassium carbonate, cesium carbonate, cesium phosphate, silver carbonate, potassium tert-butoxide, sodium tert-butoxide, cesium tert-butoxide, lithium tert-butoxide, potassium phosphate tribasic, potassium phenoxide, sodium phenoxide, a trialkyl amine, isopropoxide, and combinations thereof. In a specific example, the base can be potassium hydroxide or sodium hydroxide.

The amount of base used in the disclosed methods can be up to 1 equivalent per chlorine atom in the PVC backbone. For example, the amount of base can be from about 0.01 equivalent to about 1.5 equivalents, such as from about 0.01 equivalent to about 1 equivalent, from about 0.05 equivalent to about 1 equivalent, from about 0.1 equivalent to about 1 equivalent, from about 0.25 equivalent to about 1 equivalent, from about 0.50 equivalent to about 1 equivalent, from about 0.75 equivalent to about 1 equivalent, from about 0.9 equivalent to about 1 equivalent, or from about 0.99 equivalent to about 1 equivalent, based on the number of chlorine atoms in the backbone.

The amount of dehydrochlorination can be controlled by the amount of base. For example, increasing from about 1% KOH to about 60% KOH per Cl atom shows increasingly darker orange product, due to the increasing numbers of conjugated polyene segments. Thus, in other examples, the amount of base can be from about 1% to about 100% base per Cl atom, e.g., from about 1 to about 90, about 1 to about 80, about 1 to about 70, about 1 to about 60, about 1 to about 50, about 1 to about 40, about 1 to about 30, about 1 to about 20, or about 1 to about 10% per Cl atom.

Non-Solvent

In further examples, the dehydrochlorinated PVC (DHPVC) can be precipitated from the solvent and isolated, e.g., by filtration. A suitable non-solvent is a material in which the organic solvent has high solubility and for which the DHPVC has little or no solubility. In addition, the non-solvent can be chosen such that the impurities (organic and inorganic additives, plasticizers, residual base) have moderate to high solubility. The non-solvent can be a single solvent, e.g., water, methanol, or a mixture of solvents, inter alia, methanol/water, ethanol/water. The relative compositions of solvent mixtures can be adjusted by the formulator depending upon the isolation conditions. In specific examples, the non-solvent can be water, methanol, or mixtures thereof.

Methods for Hydrogenation of Partial, Dehydrochlorinated PVC

Furthermore, it is disclosed that the polyene segments in DHPVC can be hydrogenated back to aliphatic hydrocarbon segments (forming $H_2$-DHPVC) using conditions similar to those applied in the food industry for making saturated fats (Scheme 1). This $H_2$-DHPVC can then be further dehydrochlorinated so as to re-introduce additional polyenes. The hydrogenation, dehydrochlorination processes can be repeated to vary or tune the levels of chloro, saturated, and unsaturated residues, providing a means to control the balance and placement of chlorinated segments, polyene segments and aliphatic hydrocarbon segments forming —$(CH_2CHCl)_n$—$(CH=CH—)_m$—$(CH_2CH_2)_o$— polymer backbones which are highly tailorable to a variety of elastomer forms.

Scheme 1: Hydrogenation of DHPVC to $H_2$-DHPVC, followed by optional further dehydrochlorination. Indexes n and m can be from 1 to 100,000; indexes p and o can be from 0 to 100,000.

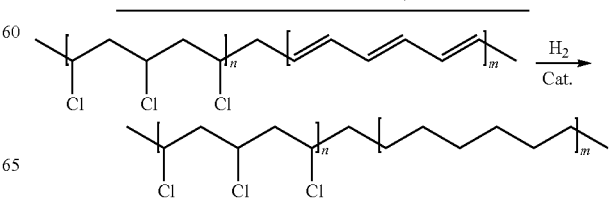

-continued

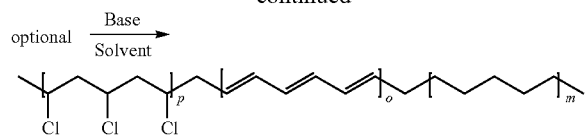

Thus, in specific examples disclosed are methods for partially hydrogenating a partially dehydrochlorinated PVC that comprise dissolving PVC in an organic solvent; contacting the PVC with a base, thereby providing the partially dehydrochlorinated PVC; optionally isolating the partially dehydrochlorinated PVC; partially hydrogenating the partially dehydrochlorinated PVC by contacting the partially dehydrochlorinated PVC with hydrogen in the presence of a hydrogenation catalyst, thereby providing a partially hydrogenated, dehydrochlorinated PVC. The partially hydrogenated, dehydrochlorinated PVC can again be dehydrochlorinated as noted herein, e.g., by dissolving the partially hydrogenated, dehydrochlorinated PVC in a second organic solvent and adding a second base. These second and subsequent dehydrochlorination reactions can be performed as disclosed above using the same or a different organic solvent and base (that is, the second organic solvent and second base can be the same as the original organic solvent and base). As an example of this process, FIG. 1 shows comparisons of FT-IR spectra for $DHPVC_{60}$ and $H_2$-$DHPVC_{60}$ showing conversion of polyene segments to saturated hydrocarbons.

The partially hydrogenated, dehydrochlorinated PVC can be from 50 to 99% hydrogenated, e.g., from about 60% to about 99%, from about 70% to about 99%, from about 80 to about 99%, from about 90 to about 99% hydrogenated, from about 95 to about 99% hydrogenated or from about 98 to about 99% hydrogenated. These products can be denoted as $H_2$-$DHPVC_b$, where "b" is the degree of hydrogenation. As an example, $H_2$-$DHPVC_{60}$ is about 60% hydrogenated (i.e., about 60% of the repeating units are —$CH_2CH_2$— and about 40% are —CHCl—$CH_2$— and —CH═CH—). Thus, the disclosed methods can be used to prepare $H_2$-$DHPVC_{50}$, $H_2$-$DHPVC_{55}$, $H_2$-$DHPVC_{60}$, $H_2$-$DHPVC_{65}$, $H_2$-$DHPVC_{70}$, $H_2$-$DHPVC_{75}$, $H_2$-$DHPVC_{80}$, $H_2$-$DHPVC_{85}$, $H_2$-$DHPVC_{90}$, and $H_2$-$DHPVC_{95}$, and any rages of these compounds.

In specific examples, partially hydrogenated, dehydrochlorinated PVC prepared by the disclosed methods can have the structure

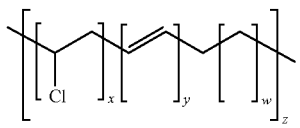

wherein x is from 1 to 1,000,000 (e.g., from 10 to 1,000,000, from 100 to 1,000,000, from 1000 to 1,000,000, from 10,000 to 1,000,000, from 100,000 to 1,000,000), y is from 0 to 1,000,000 (e.g., from 10 to 1,000,000, from 100 to 1,000,000, from 1000 to 1,000,000, from 10,000 to 1,000,000, from 100,000 to 1,000,000), w is from 1 to 1,000,000 (e.g., from 10 to 1,000,000, from 100 to 1,000,000, from 1000 to 1,000,000, from 10,000 to 1,000,000, from 100,000 to 1,000,000), and z is from 2 to 1,000,000 (e.g., from 10 to 1,000,000, from 100 to 1,000,000, from 1000 to 1,000,000, from 10,000 to 1,000,000, from 100,000 to 1,000,000).

The molecular weight of the $H_2$-DHPVC polymers prepared by the disclosed methods can be from about 2,000 daltons to about 10,000,000 daltons, and sometimes from about 5,000 daltons to about 500,000 daltons, and sometimes from about 15,000 daltons to about 200,000 daltons.

Catalyst

Suitable reagents that can be used for hydrogenating the dehydrochlorinated PVC include hydrogen with palladium catalyst (e.g., palladium on carbon, palladium (II) acetate, allylpalladium(II) chloride dimer, di-μ-chlorobis[(1,2,3-η)-1-phenyl-2-propenyl]dipalladium(II), cyclopentadienyl(allyl)palladium(II), cyclopentadienyl[(1,2,3-n)-1-phenyl-2-propenyl]palladium(II), palladium(II) chloride, palladium (II) pivlate, palladium(0)$dba_2$, palladium(II) acetylacetonate, tetrakis(triphenylphosphine)palladium(0)), hydrogen with Raney nickel catalyst, hydrogen with Raney cobalt catalyst, lithium aluminum hydride, diisobutylaluminum hydride, and sodium borohydride.

The hydrogenation reaction can be carried out at temperatures from about room temperature to about below 350° C. For example, the reaction can be carried out at temperatures from room temperature to about the boiling point of the solvent used at the pressure used. In some aspects, the reaction temperature can be from about 20° C. to 250° C., about 20° C. to 200° C., about 20° C. to 150° C., about 20° C. to 100° C., about 20° C. to about 60° C., from about 60° to about 100° C., or from about 100° C. to about 250° C.

Additional Modifications

The disclosed process can be used to also create DHPVC and $H_2$-DHPVC polymers that can provide the appropriate backbone structures for upcycling into elastomers with desired properties and performance. DHPVC and $H_2$-DHPVC can be characterized via GPC, FT-IR, NMR, and/or MALDI-TOF MS to confirm the polymer backbone is still intact, and measure changes in molecular weight occurring via changes to functional groups. Also, of interest to the elastomeric properties is the ratio of cis- and trans-linkages that are present in the DHPVC.

Elastomers (commonly called "rubbers") are a class of polymers vital to the modern economy that find use in a broad range of industrial and consumer applications, including o-rings, gaskets, garments, and footwear to name just a few. Elastomers are typically prepared by crosslinking low $T_g$ polymers, such as polyisoprene, polybutadiene, and chloroprene (aka Neoprene™), all of which currently rely on the production of new petroleum-based monomers. Unfortunately, these crosslinks are permanent; this is a fatal barrier to reprocessing and why items such as "vulcanized" car tires cannot be recycled. Using DHPVC, two types of rubbery materials are proposed: a reusable/re-moldable elastomer and a classic thermoset elastomer.

Using $H_2$-DHPVC (e.g., $H_2$-$DHPVC_{90}$), a reusable elastomer can be made from thermally reversible Diels-Alder adducts between furans and maleimides for the crosslinks. Fully recyclable elastomeric materials based on the furan and maleimide has been reported, including examples of polybutadiene and polyisoprene-based rubbers. Furan moieties can be attached to $H_2$-$DHPVC_{90}$ via simple $S_N2$ chemistry between 2-furfuryl mercaptan and the residual vinyl chloride residues of $H_2$-$DHPVC_{90}$ in the presence of a mild base (Scheme 2, top). A small amount of elimination chemistry does occur under these conditions but should be inconsequential. Subsequent combination of the furan containing $H_2$-$DHPVC_{90}$ with a bismaleimides (featuring an alkyl linking chain), at lower temperatures, will form a crosslinked network (Scheme 2, bottom).

Below 60° C., furan/maleimides Diels-Alder adducts are stable. At temperatures between ca. 60-100° C., an equilibrium between adduct formation and dissociation exists. Above 100° C., the equilibrium shifts so that Diels-Alder adduct dissociation dominates. This means, that $H_2$-DHPVC$_{90}$ elastomers crosslinked by furan/bismaleimides are re-moldable and recyclable at temperatures above 100° C.

Suitable examples of a nucleophile substituted diene are furans substituted with alkylthiol groups.

Suitable examples of bis-dienophiles are maleimides or azides linked with a linker of from 2 to 2000 atoms, e.g., an alkyl, polyalkoxyl, aryl linker, siloxane, fluoroalkyl, imidazolium, or ammonium linker. In other examples, the linker can be from 2 to 100 atoms, e.g., from 2 to 50, or from 2 to 20 atoms in length.

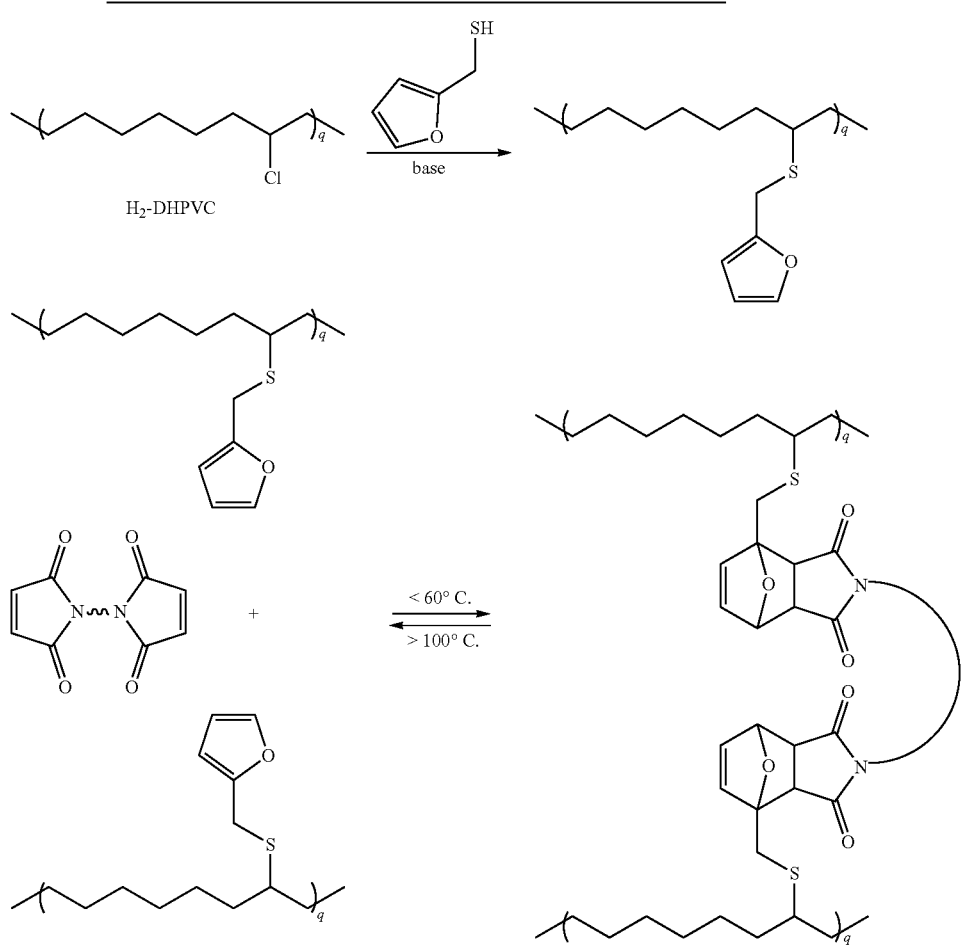

Scheme 2. Synthesis of a reversibly crosslinked $H_2$-DHPVC$_{90}$ derived elastomer.

The disclosed synthetic approach to reusable $H_2$-DHPVC$_{90}$ elastomers is tunable. The crosslinking density can be modified by changing furan loadings by using $H_2$-DHPVC with higher chlorine content. Some methods can use simple bismaleimides linked by simple alkyl or aromatic groups, although the chain length and chain morphology can be modified. Changes in the electronics of the furan and maleimides by adding substituents can also be used to alter both the kinetics and thermodynamics of the reversable Diels-Alder reaction, potentially increasing the usable temperature window for crosslinked $H_2$-DHPVC$_{90}$.

Thus, in further examples, disclosed is a method that comprises contacting the partially hydrogenated, dehydrochlorinated PVC, as described herein and as prepared herein, with a nucleophile substituted diene in the presence of a mild base, to provide a diene substituted partially hydrogenated dehydrochlorinated PVC; and then contacting the diene substituted partially hydrogenated dehydrochlorinated PVC with a bis-dienophile.

Chemical modifications of the polymers can be monitored by NMR and FT-IR spectroscopy. Thermal properties of $H_2$-DHPVC$_{90}$ elastomers can be examined using conventional DSC and TGA. DMA can be used to observe elastic properties over a range of temperatures and time-dependent behaviors (e.g., creep and relaxation). The reusability of the material can be assessed by observing changes in properties of the elastomer over numerous temperature cycles; however, based on prior work on polybutadiene furan/maleimide crosslinked systems, excellent recyclability is expected.

The thermal-reversibility of the furan/maleimide Diels-Alder adduct, will in-part, dictate potential use of $H_2$-DHPVC$_{90}$ elastomers. Potential applications for recyclable $H_2$-DHPCV elastomers, include 3D printable rubber materials and thermal moldable elastomers. 3D printing of elastomers is currently of great interest to many industries (e.g., automotive, apparel, biomedical, etc.). The disclosed approach affords similar versatility, however by using waste PVC as a feedstock, advantages are realized with low cost starting materials and simple reactions to produce solid materials with tailored properties that can be used in many types of 3-D printers.

Given the structural similarity of $H_2$-DHPVC to polyethylene, it will have a similarly low $T_g$ (<−100° C.), which is necessary to create an elastomer. If the $T_g$ of $H_2$-DHPVC needs to be depressed, alkyl chains can be grafted onto PVC by reacting long-chain alkyl thiols with PVC via an $S_N2$ mechanism to lower the $T_g$ of PVC. Plasticization is also likely to occur from the bismaleimides linked by long alkyl chains.

An important feature of $H_2$-DHPVC$_{90}$ elastomers is the low cost and sustainable nature of the chemicals necessary to synthesize it. For example, 2-furfuryl mercaptan is synthesized in 2 steps form furfural and thiourea. Bismaleimides, which are key components of bismaleimide (BMI) resins, are made in one step from malic anhydride and commodity diamines. Finally, the quantities of crosslinking agents needs is likely only a few weight % of the final material.

A second DHPVC-based rubber can be formed from DHPVC via classic vulcanization using elemental sulfur or zinc oxides, thiourea, etc. And example is shown below.

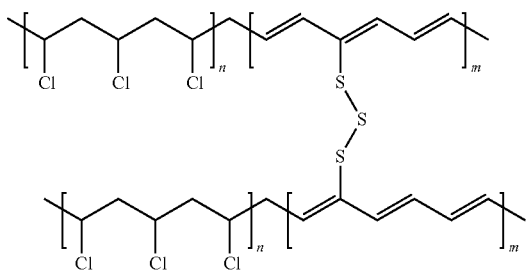

where n and m are as defined herein.

The resulting materials are traditional thermoset elastomers, with tunable properties achieved through balancing the lengths of n and m, as well as crosslink density. While having higher temperature, stability compared to reversibly crosslinked $H_2$-DHPVC$_{90}$, it will not be recyclable. The properties of DHPVC rubber will be like vulcanized Neoprene™, given their structural similarities. If necessary, the $T_g$ of DHPVC can be depressed by grafting branched alkyl chains on to the polymer backbone by $S_N2$ chemistry.

In other examples of modifications, Scheme 3, the DHPVC can be depolymerized by contacting the DHPVC with a metathesis catalyst and an olefin gas. The metathesis catalyst can be a homogeneous or heterogeneous catalyst. The metathesis catalyst can be an organoaluminum or organotin metathesis catalyst. The metathesis catalyst can be a Grubbs catalysts, Schrock catalyst, or second-generation Grubbs catalyst. The olefin gas can be ethylene or acetylene or propene. In other examples of modifications, the DHPVC can be depolymerized by oxidative cleavage.

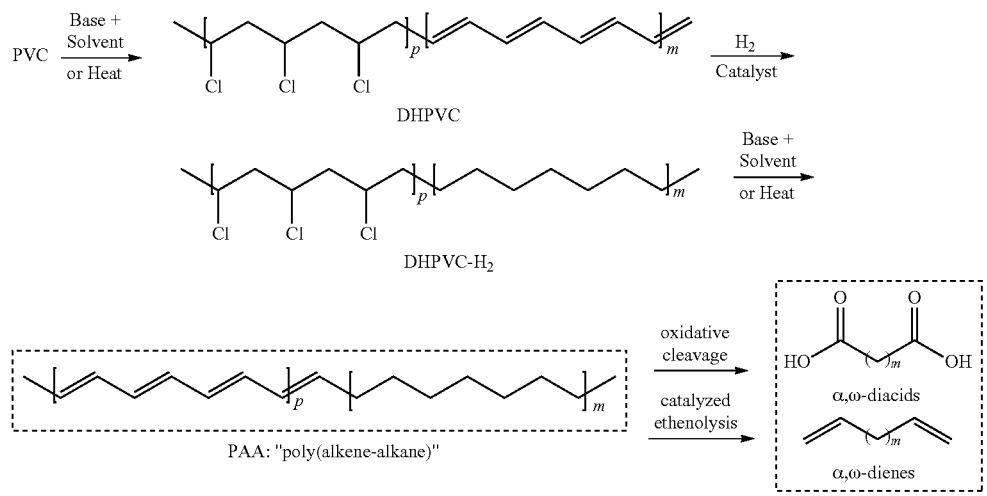

Scheme 3. Depolymerization of PVC with activating chemistries to value-added small molecules.

Oxidative cleavage via $KMnO_4/H_3O^+$ or $O_3/H_2O$ generates α,ω-dialdehydes/diols (e.g., 1,4-butanediol, a key precursor to maleic anhydride) as intermediates which can then be further oxidized to α,ω-dicarboxylic acids (i.e., $C_nH_{2(n-1)}O_4$). These diacids can also be easily converted via $H^+$/MeOH to methyl ester forms which will be used for TPE formation. Adipic acid ($C_6H_{10}O_4$) is a primary target, as it has global production of ~2.5 B kg/y, primarily as a monomer for Nylon 6,6. Upcycling PVC waste to Nylon precursors represents a major opportunity, given the premium associated with Nylon, and the long lives of Nylon products, effectively keeping PVC waste from entering the environment. This depolymerization strategy also affords access to other diacids which have important uses in polymers, cleaning agents, lubricants, pharmaceuticals, and cosmetics. These larger diacids are difficult to synthesize and/or are solely derived from plants or microorganisms. One such molecule obtainable from PVC depolymerization is heneicosanedioic acid ($C_{21}H_{40}O_4$) a component of "Japan Wax" cosmetic formulations and currently sourced from trees (*Rhus verniciflua, Rhus succedanea*).

Olefin metathesis generates α,ω-dienes by cleaving PAA via "ethenolysis" using ethylene and an olefin metathesis catalyst (i.e., Grubbs 2$^{nd}$ Generation). An important α,ω-diene is 1,3-butadiene, a precursor to synthetic rubber as well as adiponitrile, another key intermediate for Nylon. Other α,ω-dienes (e.g., 1,5-hexadiene, 1,8-nonadiene) find industrial uses as precursors to a variety of chemicals.

An essential aspect of achieving high selectivity for target products along with narrow product distributions is controlling the size and distributions of the PAA structures (i.e., 'p' and 'm' segments in Scheme 3). While the reactions performed are well-defined, achieving the yield and selectivity targets when starting from a polymer feedstock requires a deep understanding of the reaction mechanisms and selection of appropriate strategies. The influence of reaction conditions will be analyzed through systematically designed experiments that elucidate the roles of reaction variables on the formation and types of polyene structures. These parameters include: solvent (e.g., THF, DMSO, toluene, etc.), metal hydroxide (e.g., NaOH, KOH, LiOH, etc.) or other base (e.g., $K_2CO_3$), temperature; solubility of the polymer backbone as it develops more hydrocarbon character in the transition from DHPVC→DHPVC-$H_2$→PAA. Furthermore, given this potential for changes in polymer solubility (which necessitates the use of multiple solvents), it can be advantageous to explore strategies that form DHPVC at levels of only 5-10%, then cleave this DHPVC via ethenolysis (producing 1,3-butadiene) such that subsequent dehydrochlorinations, hydrogenations, and cleavage reactions are performed on oligomeric species that are more soluble in common solvents and thus easily processed into final value-added products.

EXAMPLES

To further illustrate the principles of the present disclosure, the following examples are put forth so as to provide those of ordinary skill in the art with a complete disclosure and description of how the compositions, articles, and methods claimed herein are made and evaluated. They are intended to be purely exemplary of the invention and are not intended to limit the scope of what the inventors regard as their disclosure. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

DHPVC Solubility:

Experiments were conducted to determine the solubility of DHPVC in a number of solvents. The experiments were done for DHPVC with different dehydrochlorinated degrees (40%, 60% and 80%). All experiments were done with the same conditions, 0.5 mg DHPVC per 1 mL of solvent (+/−0.1 mg). Table 1 summarizes the results.

TABLE 1

| Solubility of DHPVC in solvents. | |
|---|---|
| Solvent | Solubility |
| Dimethylformamide (DMF) | Soluble |
| Dichloromethane (DCM) | Soluble |
| Tetrahydrofuran (THF) | Soluble |
| Dimethylacetamide (DMA) | Soluble |
| Chloroform (CHCl3) | Slightly soluble |
| N-methylpyrrolidine (NMP) | Slightly soluble |
| otiDimethylsulfoxide (DMSO) | Slightly soluble |

TABLE 1-continued

| Solubility of DHPVC in solvents. | |
|---|---|
| Solvent | Solubility |
| Ethyl Acetate (EtOAc) | Insoluble |
| Propylene Glycol (PG) | Insoluble |
| Dihydrolevoglucosenone (Cyrene ™) | Insoluble |

It was noticed that despite the solubility of DHPVC in THF, the solution may "gel" when left stationary or under uneven stirring. This behavior in THF is worse with increasing dehydrochlorination degree.

Initial Dehydrochlorination (Targeted 80% removal of Cl from PVC):

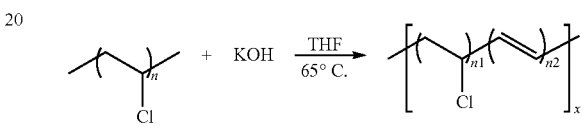

PVC (10 g, 0.160 mol), KOH (7.18 g, 0.128 mol), and THF (~650 mL) were added to 1 L round bottom flask. The vessel was equipped with a stir bar and a reflux condenser. The reaction was heated to 65° C. and stirred at this temperature overnight (18 h).

After this time, the reaction was allowed to cool to room temperature. Then, the contents of the vessel were poured in cold methanol, under high shear using a Heidolph overhead stirrer operating at 450-600 rpm. Higher shear rates help create smaller particles from the precipitate making it easier to dry.

The product was filtered, washed with an excess of methanol three more times, collected, and left to dry under vacuum. The dehydrochlorinated PVC ("DHPVC") product was characterized by FTIR before moving on with the next reaction.

Hydrogenation/Saturation of Polyene Segments:

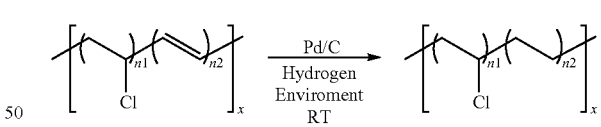

DHPVC (5 g) was added to a heavy walled 250 mL glass pressure vessel. DMF (150 mL), and 10 wt % Pd/C catalyst (0.25 g) were also added to the vessel. The vessel was sealed with a threaded PTFE cap connected to a 3-way valve. Using this valve, the vessel is purged by vacuum and then filled with hydrogen gas at a constant pressure (~45 psia). The reaction was stirred at ambient temperature for 24 hours.

After this time, the Pd/C catalyst was removed via filtration through Celite and disposed of in a safe manner. The filtrate was poured into methanol or water under stirring. The precipitated product was collected by vacuum filtration, then was left to dry on the filter for 24 hours. The "DHPVC-$H_2$" product was characterized by FTIR before moving on with the next reaction.

Second Dehydrochlorination (Optional):

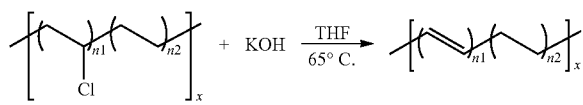

The chlorine content remaining in the DHPVC-H$_2$ product was calculated with the following equation:

$$\text{Mass of } DHPVC\text{-}H2(g) \times \frac{(100 - \text{inital percentage of } KOH)}{100} \times \frac{1}{62.5} \frac{\text{mol}}{\text{g}} \tag{1}$$

So, DHPVC-H$_2$ (2 g), KOH (0.0064 mol, 0.359 g), and 35 mL THF were added to a 50 mL round bottom flask. The process follows the same steps as the first dehydrochlorination.

Heterogenous Dehydrochlorination and Hydrogenation:

Experiments were conducted to test the viability of heterogenous condition for dehydrochlorination and hydrogenation. Dehydrochlorination was done by stirring 5 g of PVC and 1.28 g NaOH in 80 mL hexane under 60° C. The characteristic discoloration of PVC post-dehydrochlorination was noticed here. This discoloration shows the potential of success for this method.

Heterogenous hydrogenation was attempted in methanol. For this reaction, ~3 g DHPVC was stirred with 0.3 g Pd/C (10 wt %) in methanol. This process proved successful, although yields were low. This is due to the difficulty of separating the catalyst post-hydrogenation.

Depolymerization of DHPVC:

Ethylenation reactions were experimented with in attempt to depolymerize DHPVC. This was done by dissolving ~2.5 g DHPVC in 120 mL DCM or THF and stirring it with 0.025 g 2nd generation Grubb's Catalyst (1 wt %) under 30 psi of ethylene gas for ~48 hrs.

The reaction media was then immediately poured into methanol to deactivate the catalyst and precipitate the product. The product produced had a dark brown color, which is likely due to the leftover catalyst.

Substitution of Chlorine in H-DHPVC

Attempts to substitute chlorine with imidazole (1-methylimidazole specifically) were done. Here, 5 g PVC was dissolved in THF and mixed with 1.28 g NaOH to make a THF/40-DHPVC solution. The solution was filtered to remove any unreacted base or other solid byproducts. The product was left in solution for the hydrogenation reaction. The hydrogenation was done by stirring the solution with ~0.25 g Pd/C and put under 30 psi hydrogen gas for ~48 hrs. Prior to the substitution reaction, the reaction media was filtered through celite to remove the catalyst producing a clear light-green solution. The solution was then mixed with 2.76 g 1-methylimidazole in 150 mL acetonitrile (ACN) and heated to 80° C. overnight. After the reaction was concluded, ACN and THF were removed by rotation evaporation producing a yellow solid. The solid was stirred in ether to remove any unreacted 1-methylimidazole. Although the reaction showed signs of success, the method still requires more optimization to increase the yield and better the processing stage.

Commercial PVC Trials

Commercial PVC was used to produce H-DHPVC. The goal of this experiment was to determine if PVC products, like piping and packaging, need pre-treatment before going through the process of producing H-DHPVC. For this, 1.5 g of pipe or packaging PVC was stirred in DMF overnight to allow the solids to dissolve fully. The next day, 1.28 g NaOH was added and left stirring for 24 hrs. The produced solution was filtered through celite to remove unreacted base and additives that crashed out of the solution. The filtrate was then precipitated in methanol, filtered, and dried under reduced pressure overnight. The powder produced (0.5 g) had a light orange color and was sampled for characterization. The remaining product was then dissolved in DMF and mixed with 0.05 g Pd/C (10 wt %) under 30 psi hydrogen gas for ~48 hrs. The reaction media was then filtered through celite to remove the catalyst. The solution was then precipitated in methanol, filtered, and dried under reduced pressure producing 0.1 g of a grey powder.

FTIR spectra show that peaks belonging to potential additives disappearing after dehydrochlorination, giving a product that is generally similar to DHPVC made with lab-grade PVC.

The methods and compositions of the appended claims are not limited in scope by the specific methods and compositions described herein, which are intended as illustrations of a few aspects of the claims and any methods and compositions that are functionally equivalent are within the scope of this disclosure. Various modifications of the methods and compositions in addition to those shown and described herein are intended to fall within the scope of the appended claims. Further, while only certain representative methods, compositions, and aspects of these methods and compositions are specifically described, other methods and compositions and combinations of various features of the methods and compositions are intended to fall within the scope of the appended claims, even if not specifically recited. Thus, a combination of steps, elements, components, or constituents can be explicitly mentioned herein; however, all other combinations of steps, elements, components, and constituents are included, even though not explicitly stated.

What is claimed is:

1. A method of partially dehydrochlorinating polyvinylchloride (PVC), comprising: dissolving the PVC in an organic solvent; and contacting the PVC with a base, thereby providing a partially dehydrochlorinated PVC; and depolymerizing the partially dehydrochlorinated PVC by contacting the partially dehydrochlorinated PVC with a metathesis catalyst and olefin gas.

2. The method of claim 1, wherein the partially dehydrochlorinated PVC is precipitated by adding a non-solvent, and the precipitate is isolated.

3. The method of claim 1, wherein the organic solvent is tetrahydrofuran, dimethylformamide, dichloromethane, dimethylacetamide, chloroform, N-methylpyrrolidine, dimethylsulfoxide, or mixtures thereof.

4. The method of claim 1, wherein the base is potassium hydroxide or sodium hydroxide.

5. The method of claim 2, wherein the non-solvent is water, methanol, or mixtures thereof.

6. The method of claim 1, wherein the partially dehydrochlorinated PVC is from about 40% to about 95% dehydrochlorinated PVC.

7. The method of claim 1, wherein the partially dehydrochlorinated PVC has the structure

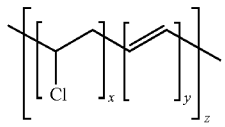

wherein x is from 1 to 1,000,000, y is from 1 to 1,000,000, and z is from 2 to 1,000,000.

8. The method of claim 1, further comprising partially hydrogenating the partially dehydrochlorinated PVC by contacting the partially dehydrochlorinated PVC with a hydrogenation catalyst, thereby providing a partially hydrogenated, dehydrochlorinated PVC.

9. The method of claim 8, wherein the hydrogenation catalyst is hydrogen with a palladium catalyst, hydrogen with Raney nickel catalyst, hydrogen with Raney cobalt, lithium aluminum hydride, diisobutylaluminum hydride, or sodium borohydride.

10. The method of claim 8, wherein the partially dehydrochlorinated PVC is dissolved in a solvent and contacted with the hydrogenation catalyst.

11. The method of claim 8, wherein the partially dehydrochlorinated PVC is contacted with the hydrogenation catalyst in a non-solvent.

12. The method of claim 8, wherein the partially hydrogenated, dehydrochlorinated PVC is from about 50 to about 99% hydrogenated.

13. The method of claim 8, further comprising contacting the partially hydrogenated, dehydrochlorinated product with sulfur.

14. The method of claim 8, wherein the partially hydrogenated, dehydrochlorinated PVC has the structure

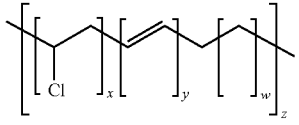

wherein x is from 1 to 100,000, y is from 0 to 100,000, w is from 1 to 100,000, and z is from 2 to 100,000.

15. The method of claim 8, further comprising contacting the partially hydrogenated, dehydrochlorinated PVC with a nucleophile substituted diene in the presence of a mild base, to provide a diene substituted partially hydrogenated dehydrochlorinated PVC; and contacting the diene substituted partially hydrogenated dehydrochlorinated PVC with a bis-dienophile.

16. The method of claim 15, wherein the bis-dienophile comprises two dienophiles linked via a linker having from 2 to 2000 atoms.

17. The method of claim 8, further comprising dehydrochlorinating the partially hydrogenated, dehydrochlorinated PVC by dissolving the partially hydrogenated, dehydrochlorinated PVC in a second organic solvent and adding a second base.

18. The method of claim 17, wherein the second organic solvent is tetrahydrofuran, dimethylformamide, dichloromethane, dimethylacetamide, chloroform, N-methylpyrrolidine, dimethylsulfoxide, or mixtures thereof.

19. The method of claim 17, wherein the second base is potassium hydroxide or sodium hydroxide.

20. The method of claim 1, wherein the temperature is below 350° C.

21. A method of partially dehydrochlorinating polyvinylchloride (PVC), comprising: dissolving the PVC in an organic solvent; and contacting the PVC with a base, thereby providing a partially dehydrochlorinated PVC; partially hydrogenating the partially dehydrochlorinated PVC by contacting the partially dehydrochlorinated PVC with a hydrogenation catalyst, thereby providing a partially hydrogenated, dehydrochlorinated PVC; and depolymerizing the partially hydrogenated, dehydrochlorinated PVC by contacting the partially hydrogenated, dehydrochlorinated PVC with a metathesis catalyst and olefin gas.

* * * * *